US010664104B2

(12) United States Patent
Yamauchi

(10) Patent No.: US 10,664,104 B2
(45) Date of Patent: May 26, 2020

(54) IMAGE RECOGNITION DEVICE, IMAGE RECOGNITION METHOD, AND IMAGE RECOGNITION UNIT

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/090,117

(22) PCT Filed: Mar. 22, 2017

(86) PCT No.: PCT/JP2017/011420
§ 371 (c)(1),
(2) Date: Sep. 28, 2018

(87) PCT Pub. No.: WO2017/170027
PCT Pub. Date: Oct. 5, 2017

(65) Prior Publication Data
US 2019/0114033 A1  Apr. 18, 2019

(30) Foreign Application Priority Data

Mar. 30, 2016  (JP) ................................ 2016-068276

(51) Int. Cl.
*G06F 3/042* (2006.01)
*G06K 9/20* (2006.01)
(Continued)

(52) U.S. Cl.
CPC ............ *G06F 3/0425* (2013.01); *G01B 11/14* (2013.01); *G01B 11/25* (2013.01); *G02B 5/18* (2013.01);
(Continued)

(58) Field of Classification Search
CPC ...... G06T 7/521; H04N 13/254; G06F 3/0425
See application file for complete search history.

(56) References Cited

U.S. PATENT DOCUMENTS 8,854,433 B1 * 10/2014 Rafii ....................... G06F 3/017
348/42
2008/0106746 A1   5/2008 Shpunt et al.
(Continued)

FOREIGN PATENT DOCUMENTS

CN  103383731 A  11/2013
JP  2004-077290 A  3/2004
(Continued)

OTHER PUBLICATIONS

Sato et al., "Range Picture Input System Based on Space-Encoding," Paper, 1984, pp. 1-15.
(Continued)

*Primary Examiner* — Kevin M Nguyen
(74) *Attorney, Agent, or Firm* — Oliff PLC

(57) ABSTRACT

An image recognition device, an image recognition method, and an image recognition unit which can achieve touch recognition with high accuracy. An image recognition device includes an image processing unit which carries out touch recognition, based on an image acquired by an image capturing device, the image capturing device being arranged in a second orthant or a third orthant, and based on a distance between a missing part generated on an image display surface due to light from a detection image display device being blocked by an object when the object is situated between the detection image display device and the image display surface, and the detection image situated on an epipolar line decided based on a positional relation between (Continued)

the image capturing device and the detection image display device and passing through the missing part, and displayed on the object.

12 Claims, 15 Drawing Sheets

(51) Int. Cl.
    *G06K 9/00*     (2006.01)
    *G06F 3/041*     (2006.01)
    *G01B 11/14*     (2006.01)
    *G06T 7/521*     (2017.01)
    *H04N 13/254*     (2018.01)
    *G01B 11/25*     (2006.01)
    *G02B 5/18*     (2006.01)
    *G03B 21/14*     (2006.01)
    *G06K 9/80*     (2006.01)
(52) U.S. Cl.
    CPC ......... *G03B 21/14* (2013.01); *G06F 3/04186* (2019.05); *G06K 9/00355* (2013.01); *G06K 9/00624* (2013.01); *G06K 9/2036* (2013.01); *G06K 9/80* (2013.01); *G06T 7/521* (2017.01); *H04N 13/254* (2018.05); *G06F 2203/04101* (2013.01)

(56) References Cited

U.S. PATENT DOCUMENTS

| | | | |
|---|---|---|---|
| 2009/0096783 | A1 | 4/2009 | Shpunt et al. |
| 2010/0177164 | A1 | 7/2010 | Zalevsky et al. |
| 2011/0158508 | A1 | 6/2011 | Shpunt et al. |
| 2012/0098865 | A1 | 4/2012 | Takano et al. |
| 2012/0281240 | A1 | 11/2012 | Cohen et al. |
| 2013/0136305 | A1 | 5/2013 | Shpunt et al. |
| 2013/0155195 | A1 | 6/2013 | Zalevsky et al. |
| 2014/0267031 | A1* | 9/2014 | Huebner ............... G06F 3/0346 345/158 |
| 2015/0287205 | A1 | 10/2015 | Zalevsky et al. |

FOREIGN PATENT DOCUMENTS

| | | |
|---|---|---|
| JP | 2009-511897 A | 3/2009 |
| JP | 2012-104096 A | 5/2012 |
| JP | 2017-126182 A | 7/2017 |
| JP | 2017-126192 A | 7/2017 |
| JP | 2017-126870 A | 7/2017 |

OTHER PUBLICATIONS

Jun. 20, 2017 International Search Report issued in International Patent Application No. PCT/JP2017/011420.

\* cited by examiner

IMAGE RECOGNITION DEVICE, IMAGE RECOGNITION METHOD, AND IMAGE RECOGNITION UNIT

TECHNICAL FIELD

The present invention relates to an image recognition device, an image recognition method, and an image recognition unit.

BACKGROUND ART

As a technique that is likely to be able to be applied to image recognition to detect whether or not a finger is in contact with a screen where an image is projected from a projector, there is a technique of projecting a NIR-light random speckle pattern, acquiring with a NIR camera NIR light (reflected light) reflected by a finger, and detecting whether or not the finger is in contact with the screen, based on the acquired information (see, for example, PTL 1).

CITATION LIST

Patent Literature

PTL 1: JP-T-2009-511897

SUMMARY OF INVENTION

Technical Problem

However, the image recognition technique described in PTL 1 has a problem in that it has poor detection accuracy for a position (depth) of the finger in the direction of depth as viewed from the NIR camera and hence poor touch recognition accuracy.

An object of the invention is to provide an image recognition device, an image recognition method, and an image recognition unit which can achieve touch recognition with high accuracy.

Solution to Problem

Such an object is achieved the following invention.

An image recognition device according to the invention is an image recognition device used in an image display unit which has a detection image display device displaying a detection image on an image display surface, and an image capturing device capturing up an image of the image display surface, and in which when a plane including a group of beams forming an upper end in a vertical direction of the detection image is a defined as a first imaginary plane, a plane including a group of beams forming a lower end in the vertical direction of the detection image is defined as a second imaginary plane, an area situated between the image display surface and the detection image display device and between the first imaginary plane and the second imaginary plane is defined as a first orthant, an area situated above the first orthant in the vertical direction is defined as a second orthant, and an area situated below the first orthant in the vertical direction is defined as a third orthant, the image capturing device is arranged in the second orthant or the third orthant.

The image recognition device includes an image processing unit which detects, based on the image acquired by the image capturing device, a distance between a missing part generated on the image display surface due to light from the detection image display device being blocked by an object when the object is situated between the detection image display device and the image display surface, and the detection image situated on an epipolar line decided based on a positional relation between the image capturing device and the detection image display device and passing through the missing part, and displayed on the object, and which determines whether the object is in contact with the image display surface or not, based on a result of the detection.

Thus, an image recognition device that can achieve touch recognition with high accuracy is provided.

In the image recognition device according to the invention, it is preferable that the detection image has a linear pattern intersecting the epipolar line.

Thus, the detection image has a relatively simple configuration.

In the image recognition device according to the invention, it is preferable that the image capturing device is arranged in the second orthant, and that both the first imaginary plane and the second imaginary plane are tilted in such a way that the image display surface side is situated below the detection image display device side.

Thus, the image capturing device can capture an image of the missing part more securely.

In the image recognition device according to the invention, it is preferable that the image capturing device is arranged in the third orthant, and that both the first imaginary plane and the second imaginary plane are tilted in such a way that the image display surface side is situated above the detection image display device side.

Thus, the image capturing device can capture an image of the missing part more securely.

In the image recognition device according to the invention, it is preferable that a missing portion of the linear pattern due to the missing part is displayed on the object, and that the image processing unit detects a distance along the epipolar line between a position where the missing portion is displayed when the object is absent and an actual position where the missing portion is displayed on the object.

Thus, touch recognition can be carried out relatively easily and with high accuracy.

In the image recognition device according to the invention, it is preferable that the image processing unit has a position estimation unit which estimates a position of a distal end part of the object, based on a shape of the misting part.

Thus, the contact position between the object and the image display surface can be detected more accurately.

In the image recognition device according to the invention, it is preferable that the detection image has a first linear pattern and a second linear pattern which extend intersecting the epipolar line and which are different patterns from each other, and that the first linear pattern and the second linear pattern are arranged alternately along a direction of extension of the epipolar line.

Thus, touch recognition can be carried out and the contact position between the object and the image display surface can be detected, with a higher resolution than the resolution of the image capturing device.

In the image recognition device according to the invention, it is preferable that the detection image has a first area situated on a near side to the image capturing device and a second area situated on a farther side from the image capturing device than the first area, that a linear pattern extending along the epipolar line is arranged in the first area, and that a linear pattern intersecting the epipolar line is arranged in the second area.

Thus, touch recognition can be carried out more securely, particularly in the first area.

An image recognition method according to the invention is an image recognition method used in an image display unit which has a detection image display device displaying a detection image on an image display surface, and an image capturing device capturing an image of the image display surface, and in which when a plane including a group of beams forming an upper end in a vertical direction of the detection image is a defined as a first imaginary plane, a plane including a group of beams forming a lower end in the vertical direction of the detection image is defined as a second imaginary plane, an area situated between the image display surface and the detection image display device and between the first imaginary plane and the second imaginary plane is defined as a first orthant, an area situated above the first orthant in the vertical direction is defined as a second orthant, and an area situated below the first orthant in the vertical direction is defined as a third orthant, the image capturing device is arranged in the second orthant or the third orthant.

The image recognition method includes detecting, based on the image acquired by the image capturing device, a distance between a missing part generated on the image display surface due to light from the detection image display device being blocked by an object when the object is situated between the detection image display device and the image display surface, and the detection image situated on an epipolar line decided based on a positional relation between the image capturing device and the detection image display device and passing through the missing part, and displayed on the object, and determining whether the object is in contact with the image display surface or not, based on a result of the detection.

Thus, touch recognition can be carried out with high accuracy.

An image recognition unit according to the invention includes:

the image recognition device according to the invention;
the detection image display device; and
the image capturing device.

Thus, an image recognition unit which can achieve touch recognition with high accuracy is provided.

It is preferable that the image recognition unit has an image display device which displays an image on the image display surface.

Thus, a desired image can be displayed on the image display surface.

DESCRIPTION OF EMBODIMENTS

Hereinafter, preferred embodiments of an image recognition device, an image recognition method, and an image recognition unit according to the invention will be described with reference to the accompanying drawings.

First Embodiment

Figure 1:
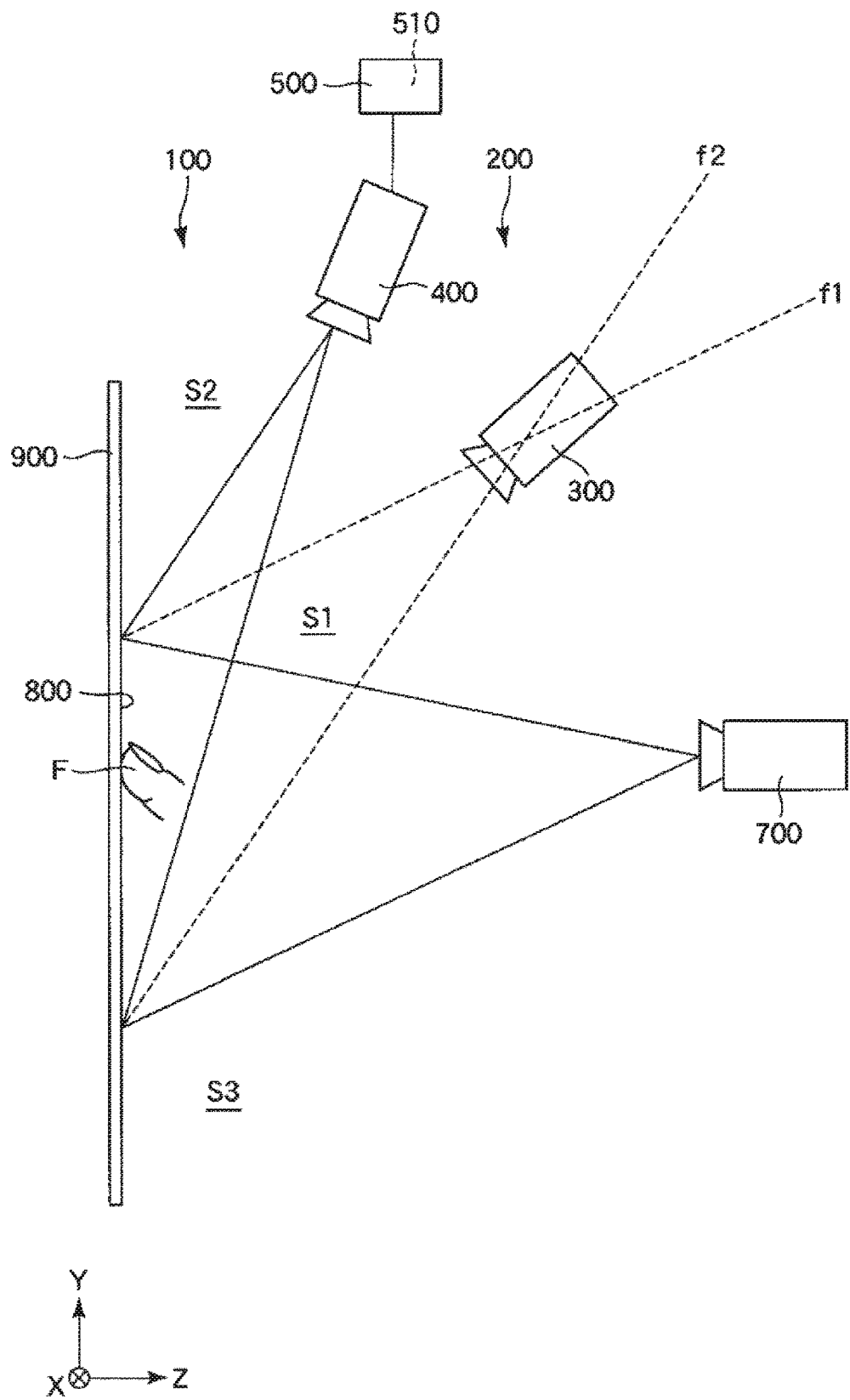
FIG. 1 is a side view showing the configuration of an image recognition unit according to a first embodiment of the invention.
Figure 2:
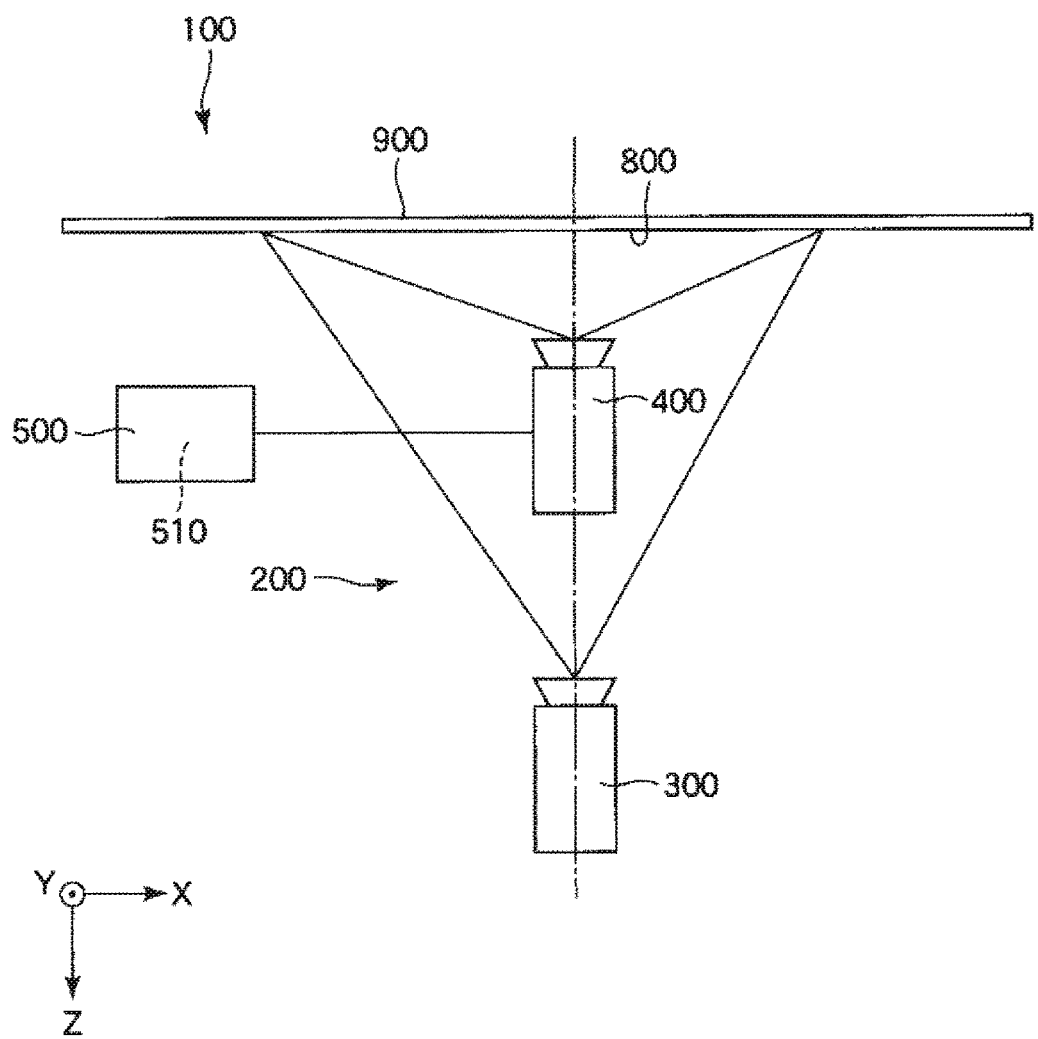
FIG. 2 is a top view of the image recognition unit shown in FIG. 1.
Figure 3:
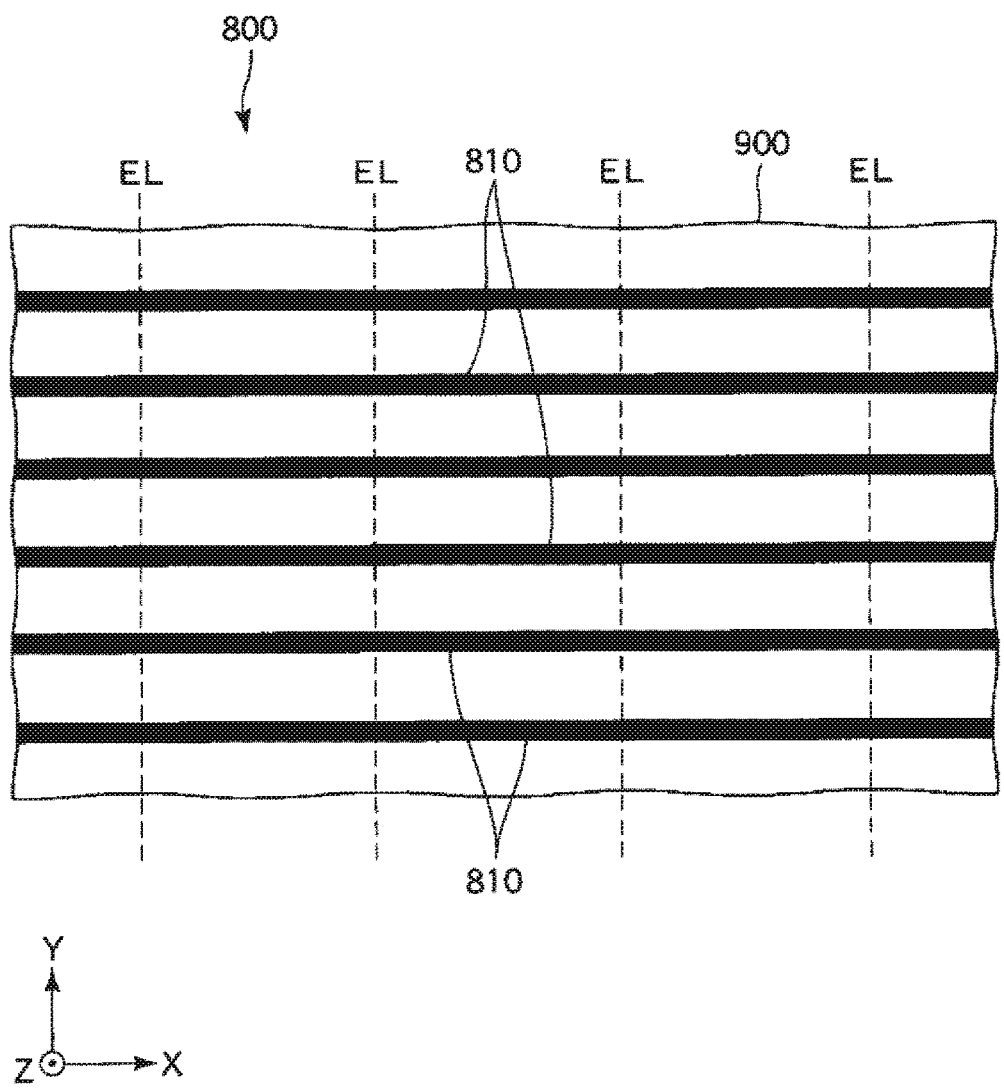
FIG. 3 is a plan view showing a detection image.
Figure 4:
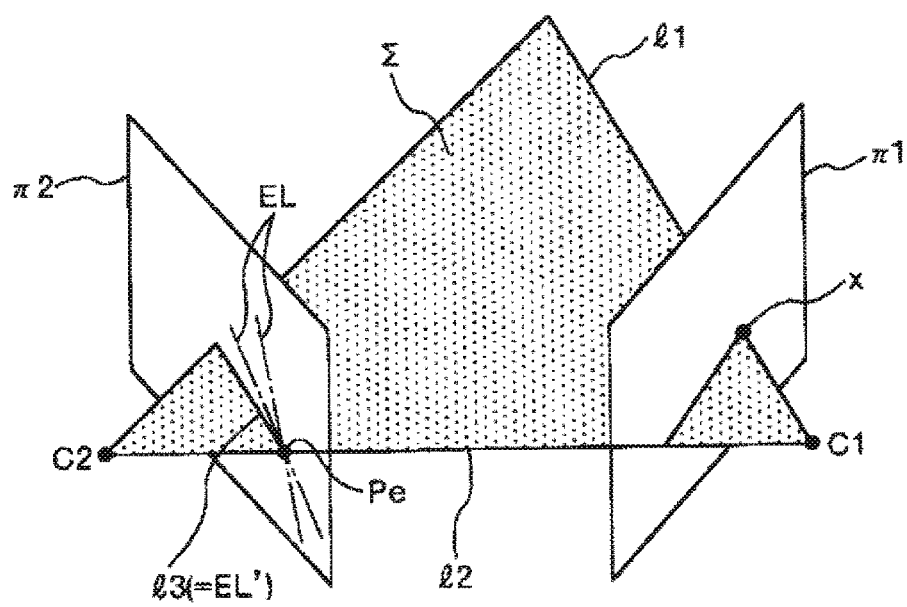
FIG. 4 is a view for explaining an epipolar line.
Figure 5:
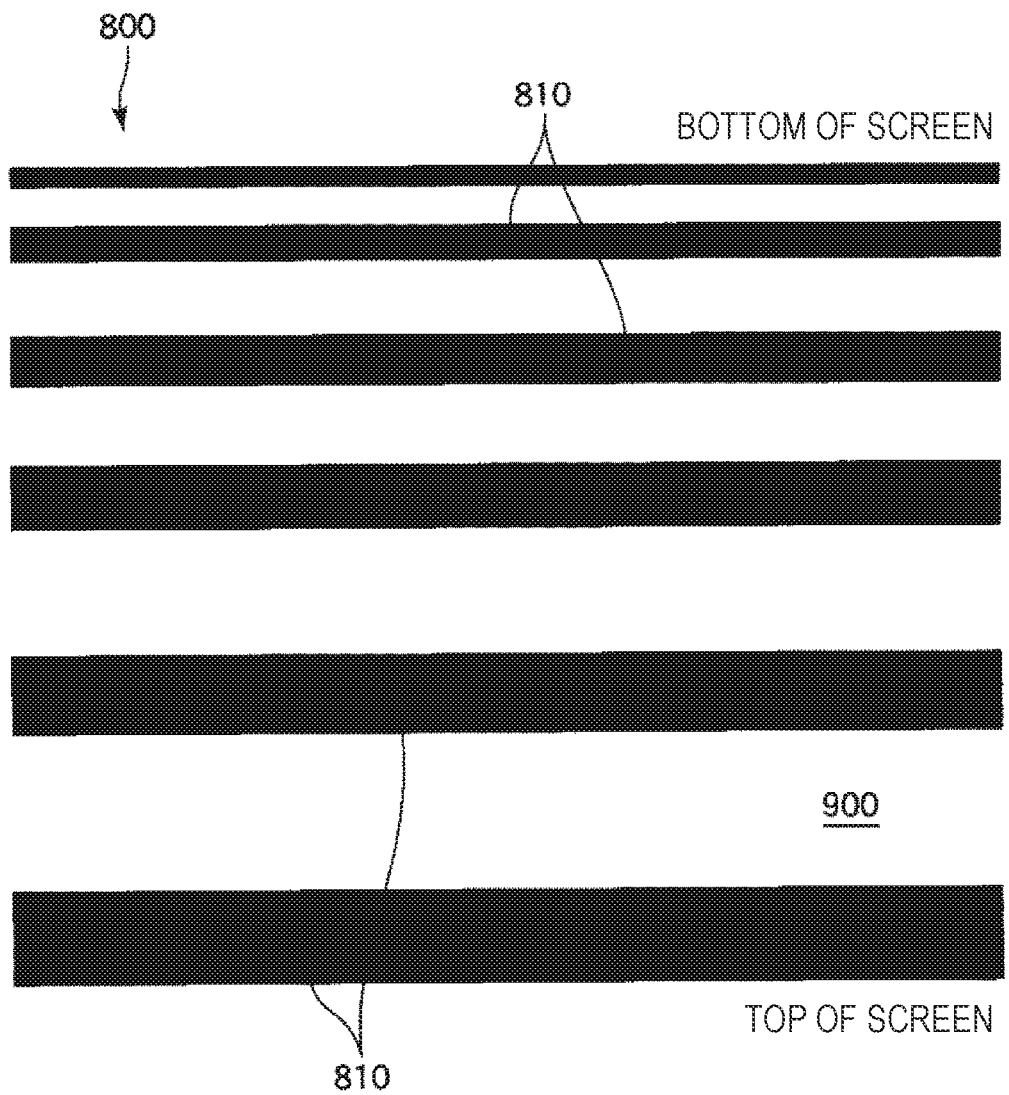
FIG. 5 is a view for explaining touch recognition.
Figure 6:
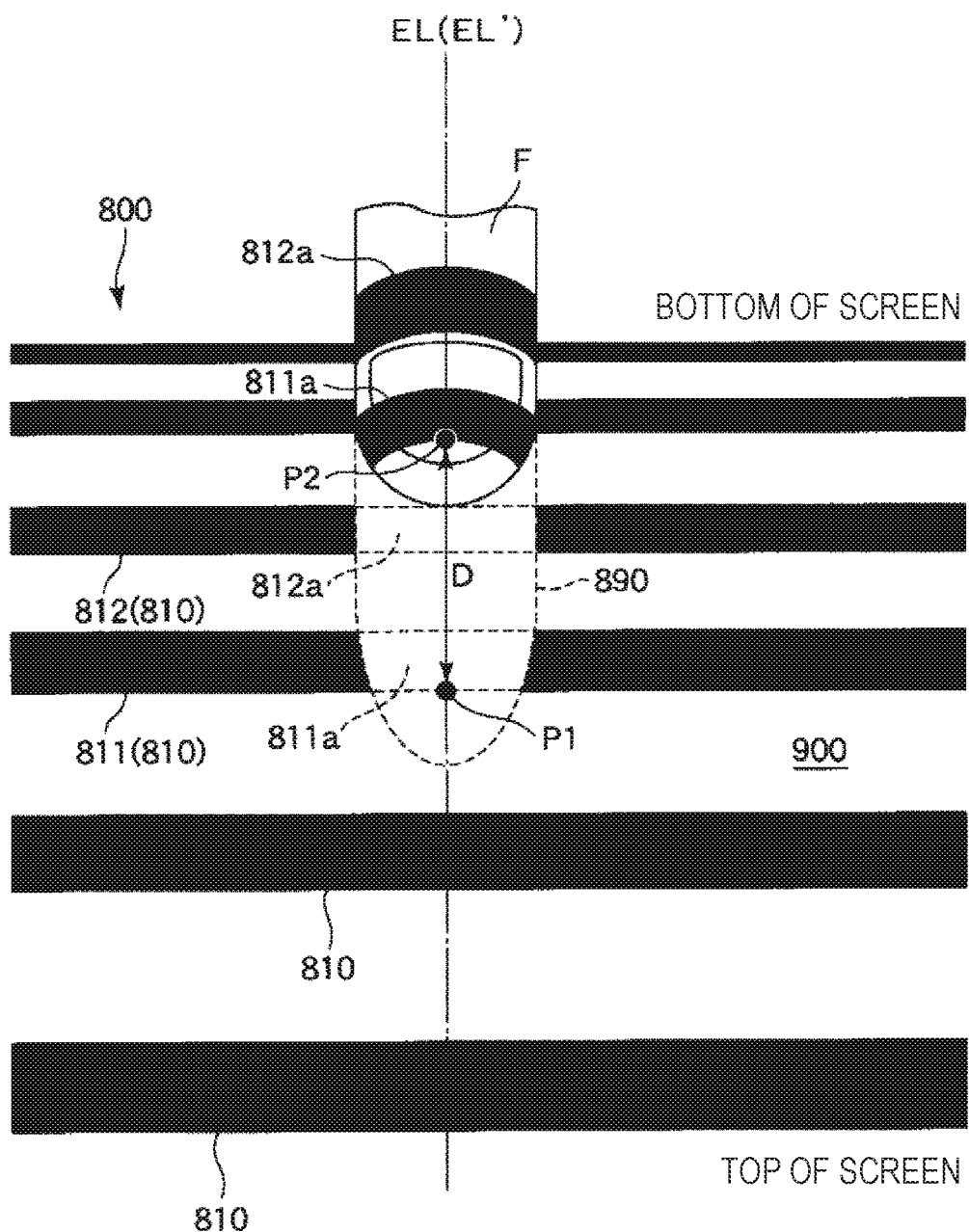
FIG. 6 is a view for explaining touch recognition.
Figure 7:
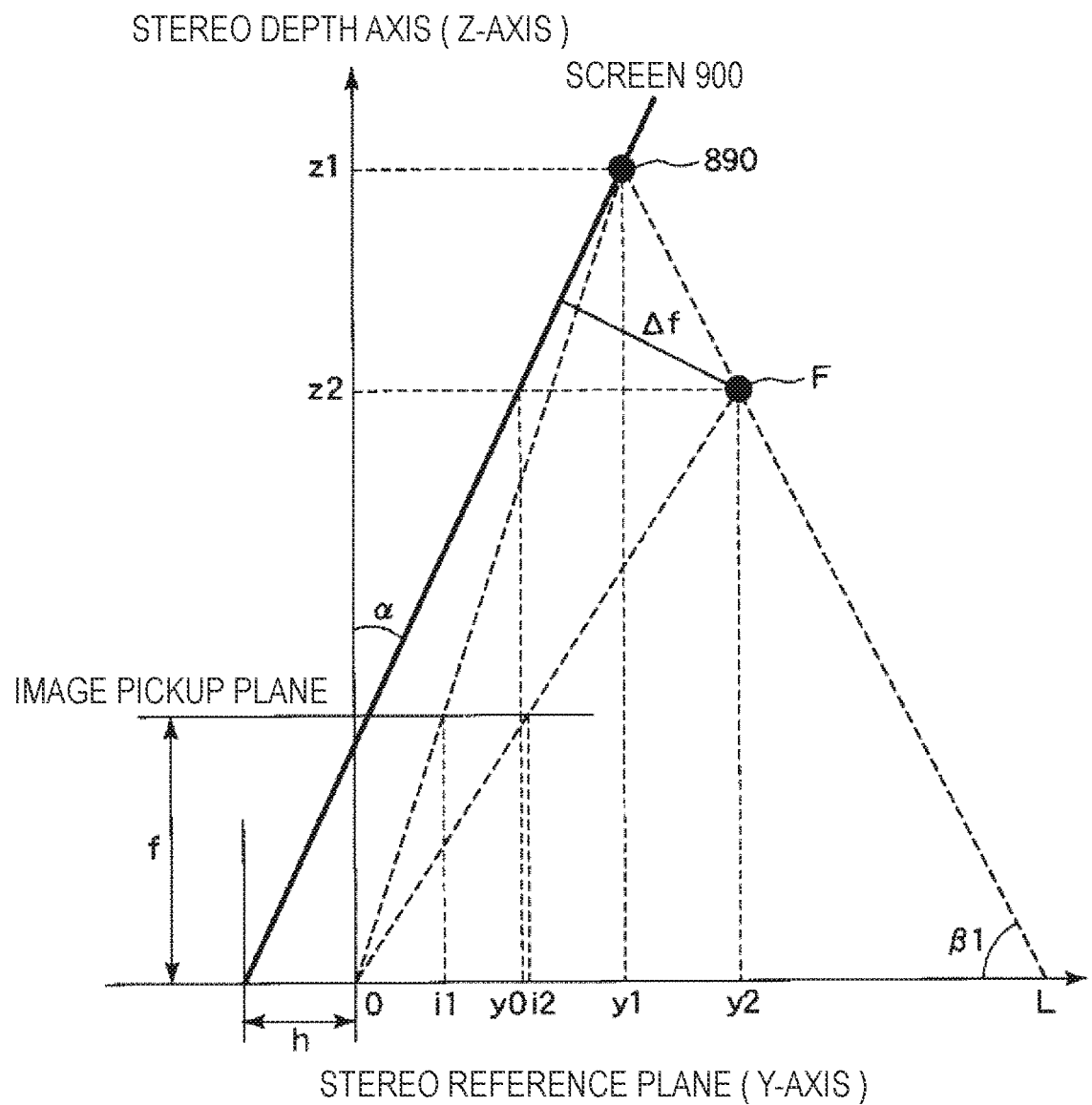
FIG. 7 is a view for explaining an example of a method for calculating a separation distance between a screen and a finger.

FIG. 1 is a side view showing the configuration of an image recognition unit according to a first embodiment of the invention. FIG. 2 is a top view of the image recognition unit shown in FIG. 1. FIG. 3 is a plan view showing a detection image. FIG. 4 is a view for explaining an epipolar line. FIG. 5 and FIG. 6 are views for explaining touch recognition. FIG. 7 is a view for explaining an example of a method for calculating a separation distance between a screen and a finger. For the sake of convenience of the description, three axes orthogonal to each other are defined as X-axis, Y-axis, and Z-axis, as shown in FIG. 1, and the Y-axis is along the vertical direction.

An image recognition unit 100 shown in FIG. 1 is a device which can determine whether or not a finger F as an object is in contact with a flat screen 900 as an image display surface. With such an image recognition unit 100, detecting the contact of the finger F with the screen 900 enables switching the image projected on the screen 900 (image to be visually recognized by the observer; hereinafter also referred to as "display image"). In the description below, the determination on whether the finger F is in contact with the screen 900 or not is referred to as "touch recognition" for the sake of convenience of the description.

The image recognition unit 100 can also be used, for example, for a presentation. Touch recognition of the finger F of the presenter is carried out and the display image projected on the screen 900 is switched, or enlarged or reduced, when necessary. Thus, it is possible to smoothly proceed with the presentation.

The image display surface is not limited to the screen 900 and may be, for example, a wall, glass or the like. The image display surface need not be flat and may be a spherical surface or concave/convex surface. The image display surface may change in shape with time. The object on which touch recognition is carries out is not limited to the finger F and may be, for example, a pointing stick, or a magnet or the like sticking to the image display surface. The use of the image recognition unit 100 is not limited to presentation and can be used for various purposes such as store guide of a department store, and description of and search for product lineup.

Such an image recognition unit 100 has: an image display unit 200 including a projector 300 as a detection image display device which displays a detection image 800 on the screen 900 and a camera 400 as an image capturing device which captures an image of the screen 900; an image recognition device 500 which carries out touch recognition; and a projector 700 as an image display device which displays a display image (image) on the screen 900, as shown in FIG. 1 and FIG. 2.

The projector 300 and the camera 400 are arranged at different positions. Also, the relative (geometric) positional relation between the projector 300 and the camera 400 is constant. Information about the positional relation is stored in a storage unit, not illustrated, of the image recognition device 500 and is used when necessary.

The specific positional relation between the projector 300 and the camera 400 will now be described. As shown in FIG. 1, when a plane including a group of beams forming an end on the upper side in the vertical direction (+Y-axis side) of the detection image 800 is defined as a first imaginary plane f1, a plane including a group of beams forming an end on the lower side in the vertical direction (−Y-axis side) of the detection image 800 is defined as a second imaginary plane f2, an area situated between the screen 900 and the projector 300 and between the first imaginary plane f1 and the second imaginary plane f2 is defined as a first orthant S1, an area situated above the first orthant S1 in the vertical direction is defined as a second orthant S2, and an area situated below the first orthant S1 in the vertical direction is defined as a third orthant S3, the camera 400 is arranged in the second orthant S2. Also, the projector 300 is suspended, for example, from a ceiling or the like and arranged in such a way as to emit light obliquely downward from a relatively high position. Moreover, light having an optical axis coincident with a normal light (Z-axis) to the screen 900 is not emitted from the projector 300. Both the first imaginary plane f1 and the second imaginary plane f2 are tilted in such a way that the screen 900 side is situated below the projector 300 side. Since the projector 300 and the camera 400 are arranged in such a manner, the camera 400 can more securely capture an image of a missing part 890 (shaded part; see FIG. 6) generated on the screen 900 when the finger F exists between the projector 300 and the screen 900 and blocks the light from the projector 300 (light forming the detection image 800).

As shown in FIG. 2, the projector 300 and the camera 400 are arranged side by side along the direction of the normal line to the screen 900 (Z-axis direction), as viewed in a plan view from above in the vertical direction. Moreover, each of the optical axis of the projector 300 and the optical axis of the camera 400 is along the direction of the normal line.

The arrangement of the projector 300 and the camera 400 has been described above. However, the arrangement of the projector 300 and the camera 400 is not limited to the foregoing arrangement, provided that the camera 400 is arranged in the second orthant S2.

Hereinafter, the projector 300, the camera 400, and the image recognition device 500 will be described in order.

[Projector 300]

The projector 300 is a device which displays the detection image 800 for carrying out touch recognition, on the screen 900. The projector 300 in this embodiment has a light source which emits NIR (near-infrared) light, a diffractive optical element which diffracts the NIR light emitted from the light source, and a lens system which projects the diffracted NIR light. Thus, the projector 300 has a relatively simple configuration. Particularly, using NIR light makes the detection image 800 difficult for a human to visually recognize. Therefore, there is no risk of deterioration of a video (display image) from the projector 700.

The projector 300 is not limited to the configuration in this embodiment, provided that the projector 300 can project the detection image 800 on the screen 900. For example, an optical scanning-type projector, an LCD-type projector, or a DMD-type projector may be employed. Also, the light source of the projector 300 is not limited to a light source which emits NIR light and may be a light source which emits visible light. In this case, it is preferable that the light source has a luminance change that makes the detection image 800 difficult for a human to visually recognize or that the detection image 800 is displayed periodically at a frequency which is difficult for human eyes to visually recognize. Thus, the risk of deterioration of the display image due to superimposition of the detection image 800 thereon can be reduced.

The detection image 800 displayed on the screen 900 by such a projector 300 is an image in which a plurality of linear patterns 810 extending in a direction intersecting epipolar lines EL are arranged at an equal pitch (equal interval) along the direction of extension of the epipolar lines EL, as shown in FIG. 3. Thus, the detection image 800 has a relatively simple configuration. Particularly in this embodiment, the linear patterns 810 are orthogonal to the epipolar lines EL. Therefore, the minimum pitch can be greater than with linear patterns 810 which are at an equal pitch in the direction of extension of the epipolar lines EL but not orthogonal to the epipolar lines EL. Thus, the image recognition device 500 can more clearly discriminate the neighboring linear patterns 810 and can carryout touch recognition with higher accuracy. Here, the pitch of the linear patterns 810 is not particularly limited and varies depending on the resolution of the camera 400. However, the pitch can be, for example, approximately 5 mm or greater and 20 mm or smaller. FIG. 3 illustrates the detection image 800 which is stereo-rectified so that the epipolar lines EL are vertical components, for the sake of convenience of the description. In practice, since the epipolar lines EL extend radially, the linear patterns 810 are arcuate patterns.

The epipolar lines EL will now be briefly described. The epipolar lines EL are lines decided based on the geometric (relative) positional relation between the projector 300 and the camera 400. Specifically, as shown in FIG. 4, a point of intersection between a straight line (baseline) 12 connecting a camera center (principal point of the lens system) C1 of the camera 400 and a projector center (principal point of the lens system) C2 of the projector 300, and an imaginary image plane π2 of the projector 300, is referred to as an epipolar point Pe, and all straight lines passing through the epipolar point Pe within the imaginary image plane π2 are referred to as epipolar lines EL.

If the finger F is included in the image of the camera 400, a coordinate (in-plane coordinate) x of the finger F within an image plane π1 of the camera 400 is decided. A plane prescribed by a straight line 11 passing through this coordinate x and the camera center C1, and the straight line 12, is referred to as an epipolar plane Σ. Then, if an epipolar line EL which coincides with a straight line 13 formed by the epipolar plane Σ and the imaginary image plane π2 intersecting each other is defined as an "epipolar line EL'", the finger F is situated somewhere on the epipolar line EL'.

The detection image 800 has been described above. However, the detection image 800 is not limited to this, provided that the detection image 800 can be used for touch recognition. For example, an image in which a plurality of points (dots) are evenly scattered may be employed.

[Camera 400]

The camera 400 is a device which captures an image of the detection image 800 on the screen 900. Such a camera 400 is, for example, a NIR camera compatible with NIR light and has a light receiving unit including a lens system and an image capturing element, and a processing unit which processes a video signal from the image capturing element.

[Image Recognition Device]

The image recognition device 500 is a device which carries out touch recognition, using the projector 300 and the camera 400 described above. Such an image recognition device 500 has an image processing unit 510, as shown in FIG. 1. The image processing unit 510 is configured to detect, based on an image acquired by the camera 400, a distance D between the missing part 890 generated on the screen 900 due to the light from the projector 300 (light forming the detection image 800) being blocked by the finger F when the finger F is situated between the projector 300 and the screen 900, and the detection image 800 situated on the epipolar line EL' decided based on the positional relation between the camera 400 and the projector 300 and passing through the missing part 890, and displayed on the finger F, and to determine to carry out touch recognition based on the result of the detection (distance D thus found). Using the distance D in this manner enables easy and highly accurate touch recognition. The image processing unit 510 will now be described specifically.

FIG. 5 and FIG. 6 are views showing an image formed by stereo-rectifying the detection image 800 on the screen 900 captured by the camera 400. If the finger F does not exist between the screen 900 and the projector 300, the light from the projector 300 is cast on the screen 900 without being blocked. Therefore, as shown in FIG. 5, the missing part 890 is not generated in the detection image 800 displayed on the screen 900. In contrast, if the finger F exists between the screen 900 and the projector 300, the light from the projector 300 is blocked by the finger F. Therefore, as shown in FIG. 6, the missing part 890 corresponding to the part blocked by the finger is generated in the detection image 800 displayed on the screen 900, and a portion that is missing (missing portion) due to the missing part 890 is shifted in the direction of extension of the epipolar lines EL and displayed on the finger F.

As shown in FIG. 6, missing portions 811a, 812a missing due to the missing part 890, of linear patterns 811, 812 (810), are shifted in the direction of extension of the epipolar line EL' and displayed on the finger F. Therefore, the image processing unit 510 sets an original position P1 of the missing portion 811a (position where the missing portion 811a is displayed when the finger F does not exist), from the stereo-rectified image, and based on the position of the linear pattern 811 situated to the uppermost side (distal side from the finger F) of the linear patterns 811, 812 overlapping the missing part 890. The image processing unit 510 then sets an actual position P2 of the missing portion 811a situated on the epipolar line EL' passing through the position P1 and displayed on the finger F. No linear patterns 810 other than the linear pattern 811 can be displayed between the missing portion 811a on the finger F and the missing part 890. Therefore, it can be affirmed that the first linear pattern 810 to appear below the missing part 890 is the missing portion 811a. Next, the image processing unit 510 finds the distance D between the position P1 and the position P2 along the epipolar line EL'. This distance D becomes shorter as the separation distance between the screen 900 and the finger F becomes shorter. Therefore, the image processing unit 510 determines that it is a "contact state" where the finger F is in contact with the screen 900, for example, if the distance D is equal to or less than a preset threshold. The image processing unit 510 determines that is it a "non-contact state" where the finger F is not in contact with the screen 900 if the distance D exceeds the threshold (determination step). Such an image processing unit 510 may simply have to find the distance D and therefore can carry out touch recognition relatively easily and with high accuracy.

Moreover, the image processing unit 510 detects XY coordinates (plane coordinates) of the touch position of the finger F, from the stereo-rectified image. The distal end part of the missing part 890 corresponds to the position of the distal end part of the finger F. Therefore, it is preferable that the coordinates of the distal end part (missing portion 811a) of the missing part 890 are detected as the coordinates of the touch position.

The image processing unit 510 also transmits the result of touch recognition to a control unit, not illustrated. If the result of touch recognition transmitted from the image processing unit 510 is "contact state", the control unit, having received the result of determination, transmits a screen operation command defined according to the contact position of the finger F, such as a command to enlarge or reduce the display image displayed on the screen 900 or a command to switch the display image, to the projector 700, based on the coordinate information of the touch position transmitted together. With such control, the display image displayed on the screen 900 can be operated simply by touching the screen 900 with the finger F. Therefore, the image recognition unit 100 with excellent convenience is provided.

Such an image recognition unit 100 can achieve touch recognition with high accuracy.

Now, an example of a method for calculating the separation distance between the screen 900 and the finger F (floating distance of the finger F from the screen 900) will be described below with reference to FIG. 7. When the focal length of the camera 400 is f, a baseline length formed by the distance between the camera 400 and the projector 300 is L, the tilt of the optical axis of the camera 400 in relation to the screen 900 is a, and the distance between the camera 400 and the screen 900 (distance in the direction of a stereo reference plane) is h, the relations of $\tan \beta 1 = z1/(L-y1)$, $\tan \alpha = (h+y1)/z1$, $z1 = y1 \times (f/i1)$, and $z2 = y2 \times (f/i2)$ are satisfied by calibrations carried out in advance. Also, based on the basic principle of triangulation, the relations of $z1 = L/\{(i1/f)+(1/\tan \beta 1)\}$ and $z2 = L/\{(i2/f)+(1/\tan \beta 1)\}$ are satisfied. Also, based on FIG. 7, the relation of $(h+y1)/z1 = (h+y0)/z2$ is satisfied. Therefore, the separation distance Δf between the screen 900 and the finger F satisfies the relation of $\Delta f = (y2-y0) \times \cos \alpha$. Thus, the separation distance Δf between the screen 900 and the finger F can be calculated relatively easily.

Second Embodiment

Next, an image recognition unit according to a second embodiment of the invention will be described.

Figure 8:
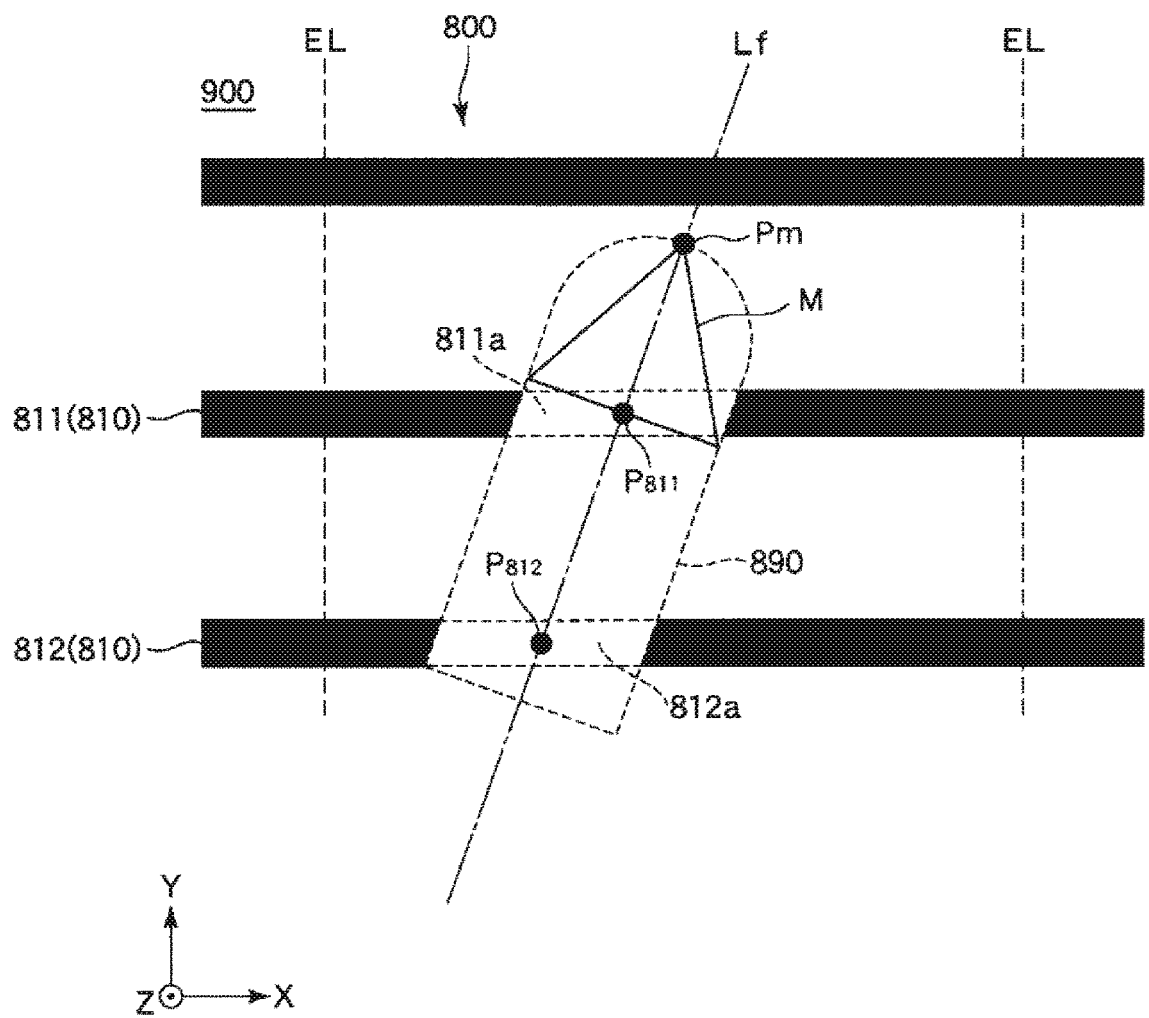
FIG. 8 is a view for explaining touch recognition in an image recognition unit according to a second embodiment of the invention.

FIG. 8 is a view for explaining touch recognition by the image recognition unit according to the second embodiment of the invention. For the sake of convenience of the description, FIG. 8 shows a view in which stereo-rectification is done so that epipolar lines are vertical components.

The image recognition unit according to the second embodiment of the invention is described below. Differences from the foregoing embodiment are mainly described and the description of similar matters is omitted.

The image recognition unit in the second embodiment is similar to the first embodiment, except in that the configuration of the image recognition device is different. Similar components as those in the foregoing embodiment are denoted by the same reference signs.

The image processing unit 510 can detect the XY coordinates of the touch position more accurately than in the first embodiment. A specific explanation is given below. The image processing unit 510 in this embodiment has a position estimation unit which estimates the position of the distal end part of the finger F, based on the shape of the missing part 890. The position estimation unit sets a line segment Lf passing through midpoints $P_{811}$, $P_{812}$ in the direction of the length of the missing portions 811a, 812a of the linear patterns 811, 812 missing due to the missing part 890, and estimates that the finger F extends in the direction of extension of this line segment Lf, as shown in FIG. 8. Next, the position estimation unit generates an imaginary regular rectangle-shaped marker M with each side having the same length as the missing portion 811a situated on the uppermost side of the missing part 890, of the missing portions 811a, 812a, and arranges the marker M on the distal end side of the missing portion 811a (opposite to the finger F), in such a way as to follow the line segment Lf. Since the marker M has a shape similar to the distal end part (fingertip) of the finger F, it can be estimated that a vertex Pm of the marker M is at the position of the distal end part of the finger F. Therefore, the image processing unit 510 detects the XY coordinates of the vertex Pm as the coordinates of the touch position. In this way, having the position estimation unit makes it possible to detect the coordinates of the touch position more accurately.

When the pitch of the linear patterns 810 is $D_{810}$ and the length of the missing portion 811a (missing portion situated on the uppermost side of the missing part 890) is $D_{890}$, it is preferable that above estimation by the position estimation unit is carried out only if the relation of $D_{810} > D_{890}$ is satisfied. In other words, it is preferable that the above estimation by the position estimation unit is carried out only if the vertex Pm of the marker M is situated below the linear pattern 810 situated directly above the linear pattern 811. This is because if the above estimation by the position estimation unit is carried out where $D_{810} \leq D_{890}$ holds, the amount of shift from the actual position of the distal end part of the finger F may be greater than in the case where the estimation is not carried out.

The second embodiment as described above can achieve effects similar to those of the first embodiment. While the marker M in this embodiment is formed as a regular triangle, the shape of the marker M is not particularly limited and can be properly changed so as to follow the shape of the distal end of the object.

Third Embodiment

Next, an image recognition unit according to a third embodiment of the invention will be described.

Figure 9:
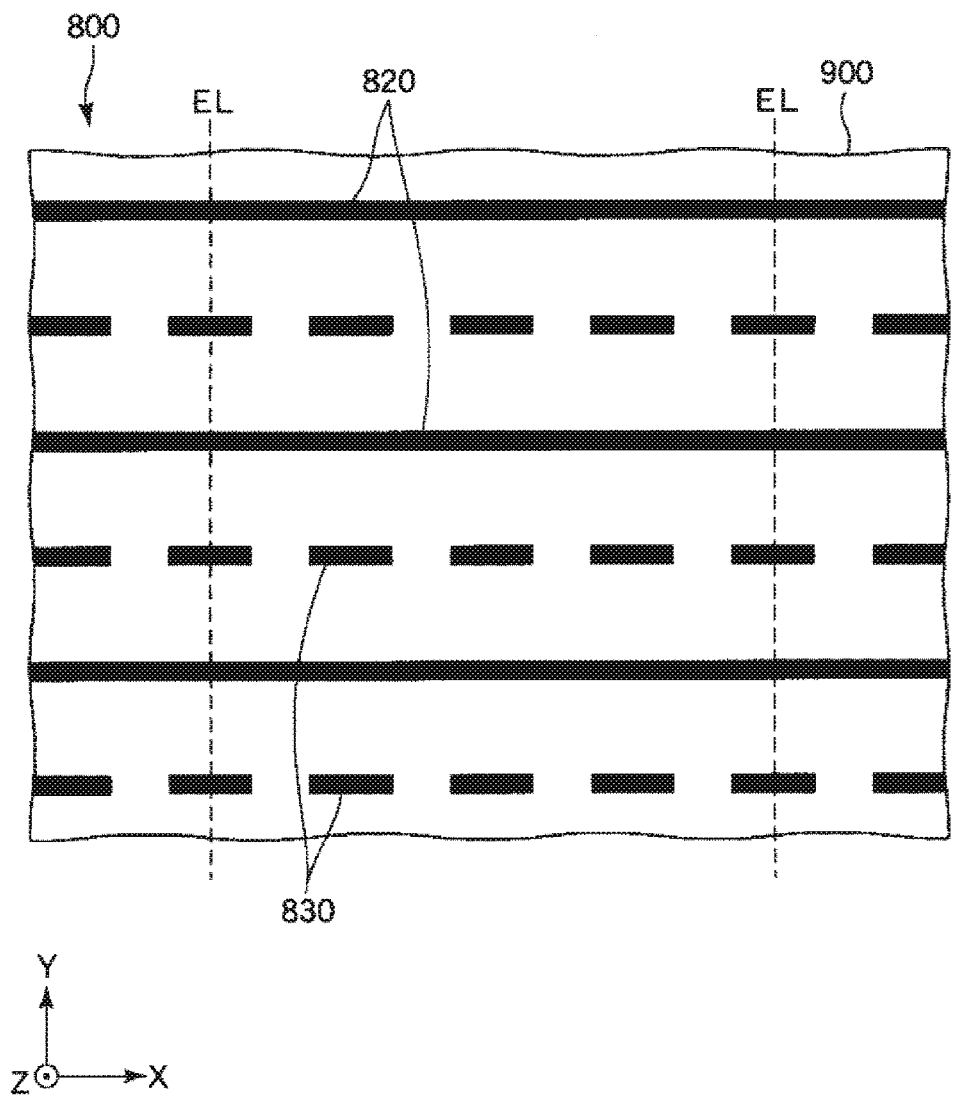
FIG. 9 is a view showing a detection image used in an image recognition unit according to a third embodiment of the invention.
Figure 10:
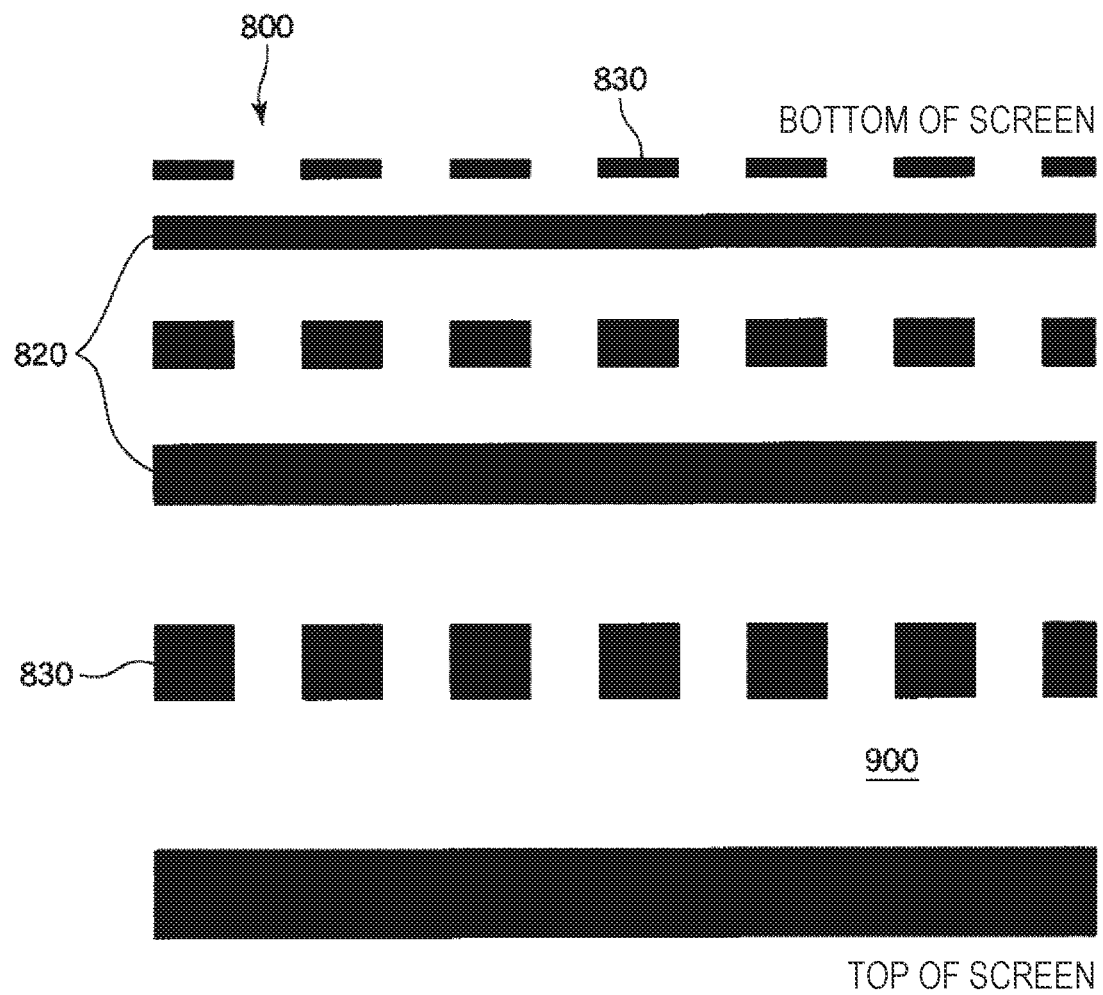
FIG. 10 is a view showing an image acquired by a camera and stereo-rectified.
Figure 11:
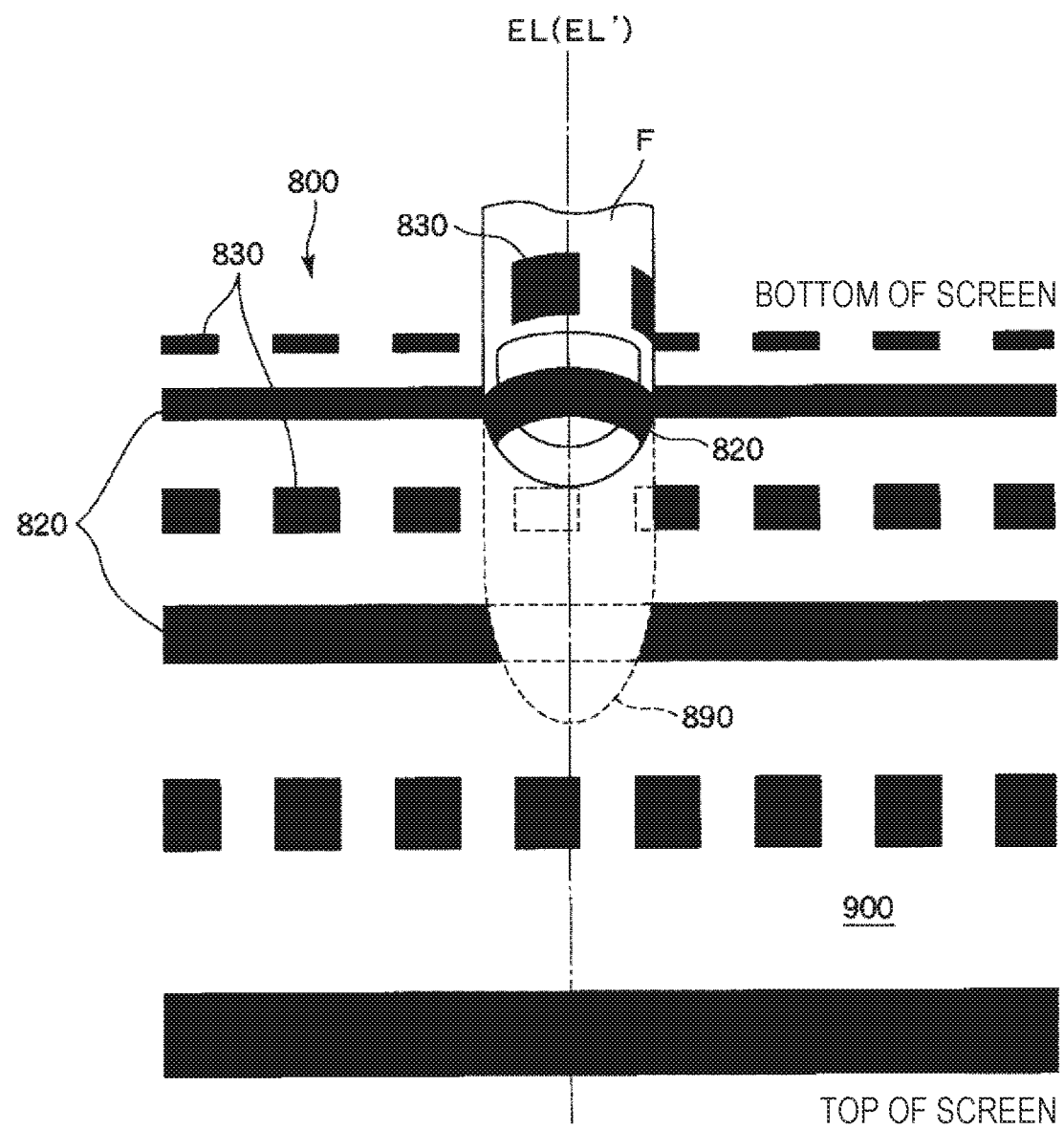
FIG. 11 is a view showing an image acquired by a camera and stereo-rectified.

FIG. 9 is a view showing a detection image used in the image recognition unit according to the third embodiment of the invention. FIG. 10 and FIG. 11 are views showing an image acquired by a camera and stereo-rectified.

The image recognition unit according to the third embodiment of the invention is described below. Differences from the foregoing embodiments are mainly described and the description of similar matters is omitted.

The image recognition unit in the third embodiment is similar to the first embodiment, except in that the detection image is different. Similar components as those in the foregoing embodiments are denoted by the same reference signs.

As shown in FIG. 9, the detection image 800 in this embodiment has a first linear pattern 820 and a second linear pattern 830 which extend intersecting (in this embodiment, orthogonal to) the epipolar lines EL and which are different patterns from each other. The first and second linear patterns 820, 830 are arranged alternately along the direction of extension of the epipolar lines EL. The first linear pattern 820 is a pattern with a constant luminance in the direction of extension. The second linear pattern 830 is a pattern in which a part with a first luminance and a part with a second luminance that is different from the first luminance are arranged alternately and cyclically (at an equal interval).

The angle between the screen 900 and the camera 400 becomes smaller as it goes toward the bottom of the screen 900. Therefore, in an image acquired by the camera 400, the pitch of the first and second linear patterns 820, 830 gradually decreases as it goes toward the bottom of the screen 900, and the width of the first and second linear patterns 820, 830 gradually decreases as well, as shown in FIG. 10. Therefore, it is conceivable that, depending on the resolution of the camera 400, the detection image 800 (first and second linear patterns 820, 830) projected in an upper part of the screen 900 can be sharply recognized, whereas the detection image 800 (first and second linear patterns 820, 830) projected in a lower part of the screen 900 is difficult to recognize sharply.

Therefore, in the lower part of the screen 900, it may not be possible to recognize which of the first and second linear patterns 820, 830 is situated at the uppermost (distal end side) of the missing part 890. Meanwhile, the finger F has a large angle with the camera 400 even when situated in the lower part of the screen 900, as shown in FIG. 11. Therefore, the first and second linear patterns 820, 830 projected on the finger F can be sharply recognized. Thus, by recognizing which of the first and second linear patterns 820, 830 is situated on the most distal end side of the finger F, it is possible to determine which of the first and second linear patterns 820, 830 is situated on the most distal end side of the missing part 890. This is because the linear pattern situated on the most distal end side of the finger and the linear pattern situated on the most distal end side of the missing part 890 are patterns in the same line. Thus, according to this embodiment, touch recognition can be carried out with a higher resolution than the resolution of the camera 400, and the XY coordinates of the touch position can be acquired.

The third embodiment as described above can achieve effects similar to those of the first embodiment. In this embodiment, the detection image is configured in such a way that the first linear pattern 820 and the second linear pattern 830 are arranged alternately along the direction of extension of the epipolar lines EL. However, the detection image is not particularly limited. For example, the detection image may have a third linear pattern that is different from the first and second linear patterns 820, 830.

Fourth Embodiment

Next, an image recognition unit according to a fourth embodiment of the invention will be described.

Figure 12:
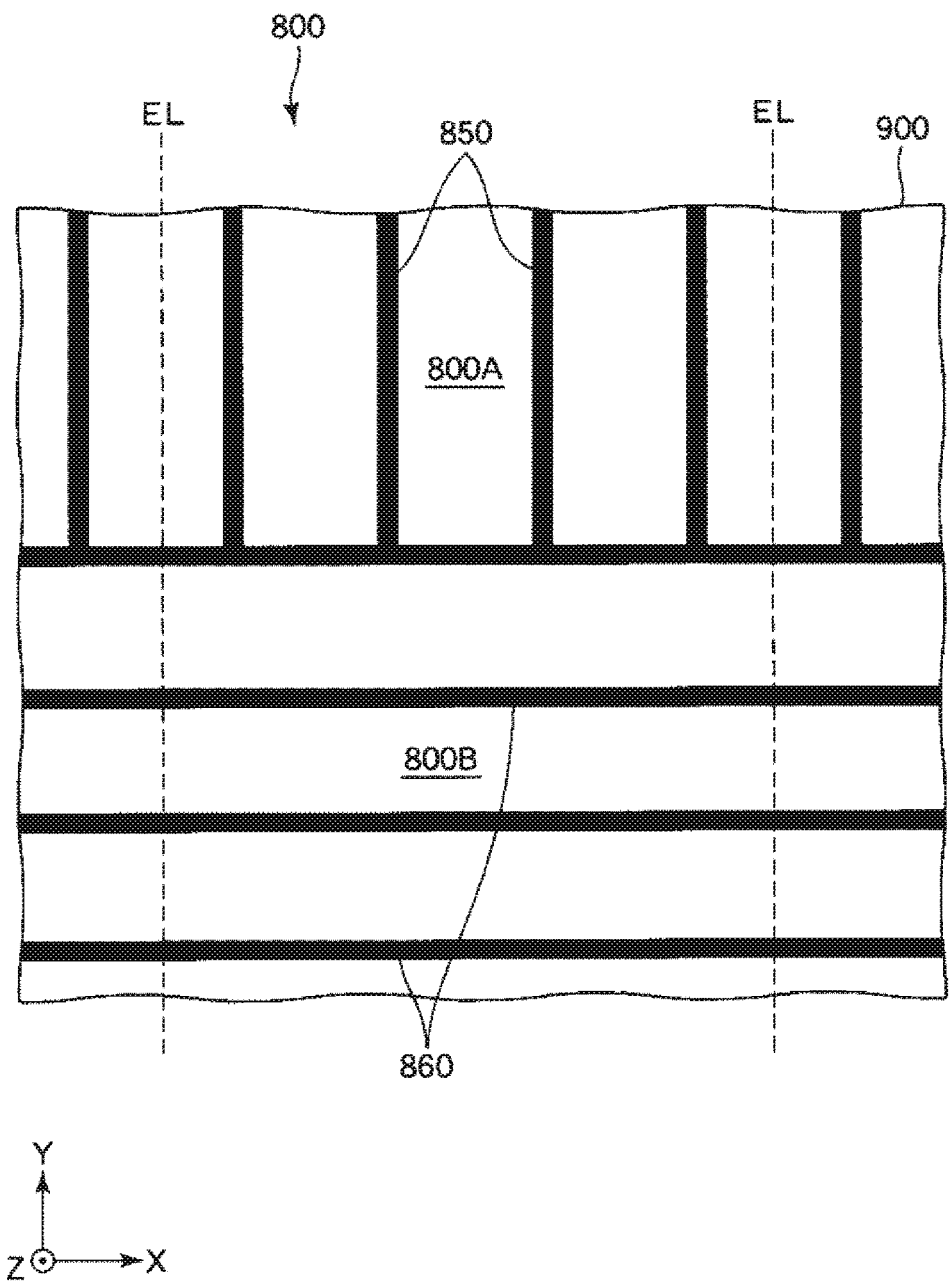
FIG. 12 is a view showing a detection image used in an image recognition unit according to a fourth embodiment of the invention.
Figure 13:
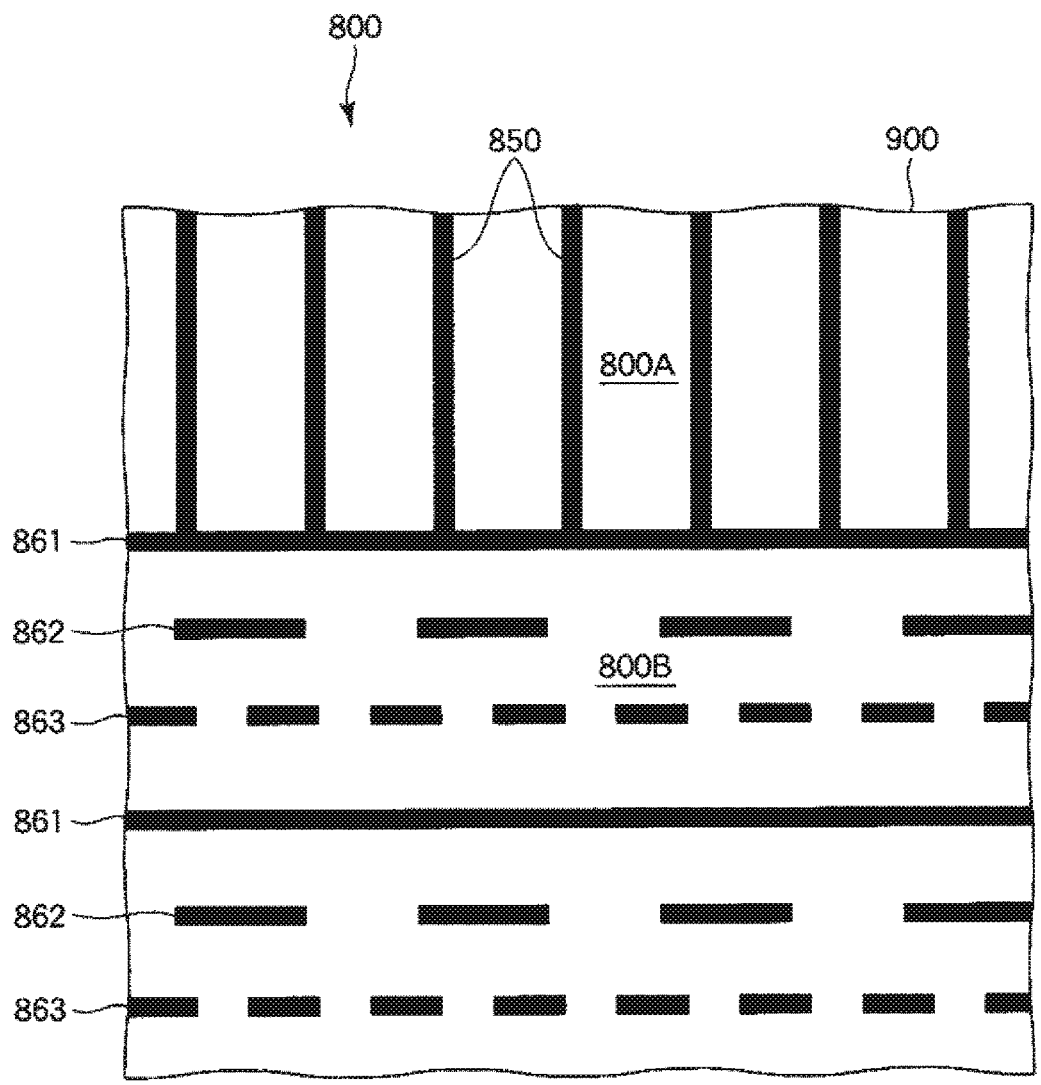
FIG. 13 is a view showing a modification of the detection image shown in FIG. 12.

FIG. 12 is a view showing a detection image used in the image recognition unit according to the fourth embodiment of the invention. FIG. 13 is a view showing a modification of the detection image shown in FIG. 12.

The image recognition unit according to the fourth embodiment of the invention is described below. Differences from the foregoing embodiments are mainly described and the description of similar matters is omitted.

The image recognition unit in the fourth embodiment is similar to the first embodiment, except in that the detection image is different. Similar components as those in the foregoing embodiments are denoted by the same reference signs.

As a problem with the first embodiment, the following problem may be mentioned. That is, when the finger F approaches the screen 900 along a direction that is different from the direction of the normal line to the screen 900 (Z-axis direction), the distance D changes according to the separation distance between the screen 900 and the finger F. Therefore, touch recognition can be carried out, based on the distance D. However, when the finger F approaches the screen 900 along the direction of the normal line to the screen 900, the distance D does not changed even if the separation distance between the screen 900 and the finger F changes. Therefore, accurate touch recognition cannot be carried out. Such a problem occurs particularly in the upper part of the screen 900, where the resolution of the camera 400 is high. Thus, in this embodiment, a detection image 800 that enables accurate touch recognition to be carried out even when the finger F approaches the screen 900 along the direction of the normal line to the screen 900 is provided.

As shown in FIG. 12, the detection image 800 in this embodiment has a first area 800A situated in an upper part (near side to the camera 400) of the screen 900 and a second area 800B situated in a lower part (far side from the camera 400) of the screen 900. In the first area 800A, a plurality of linear patterns 850 extending along the epipolar lines EL are arranged at an equal pitch along a direction orthogonal to the epipolar lines EL. Meanwhile, in the second area 800B, a plurality of linear patterns 860 intersecting (in this embodiment, orthogonal to) the epipolar lines EL are arranged at an equal pitch along the direction of extension of the epipolar lines EL. With such a configuration, touch recognition can be carried out more securely in the first area 800A even when the finger F approaches the screen 900 along the direction of the normal line to the screen 900.

The fourth embodiment as described above can achieve effects similar to those of the first embodiment. As a modification of the detection image 800 in this embodiment, a detection image 800 as shown in FIG. 13 may be employed. In second area 800B of the detection image 800 shown in FIG. 13, a plurality of linear patterns 861, 862, 863 which are orthogonal to (intersecting) the epipolar lines EL and are different patterns from each other are arranged at an equal pitch and alternately along the direction of extension of the epipolar lines EL. With such a configuration, touch recognition can be accurately carried out even in the lower part of the screen 900, as in the third embodiment.

Fifth Embodiment

Next, an image recognition unit according to a fifth embodiment of the invention will be described.

Figure 14:
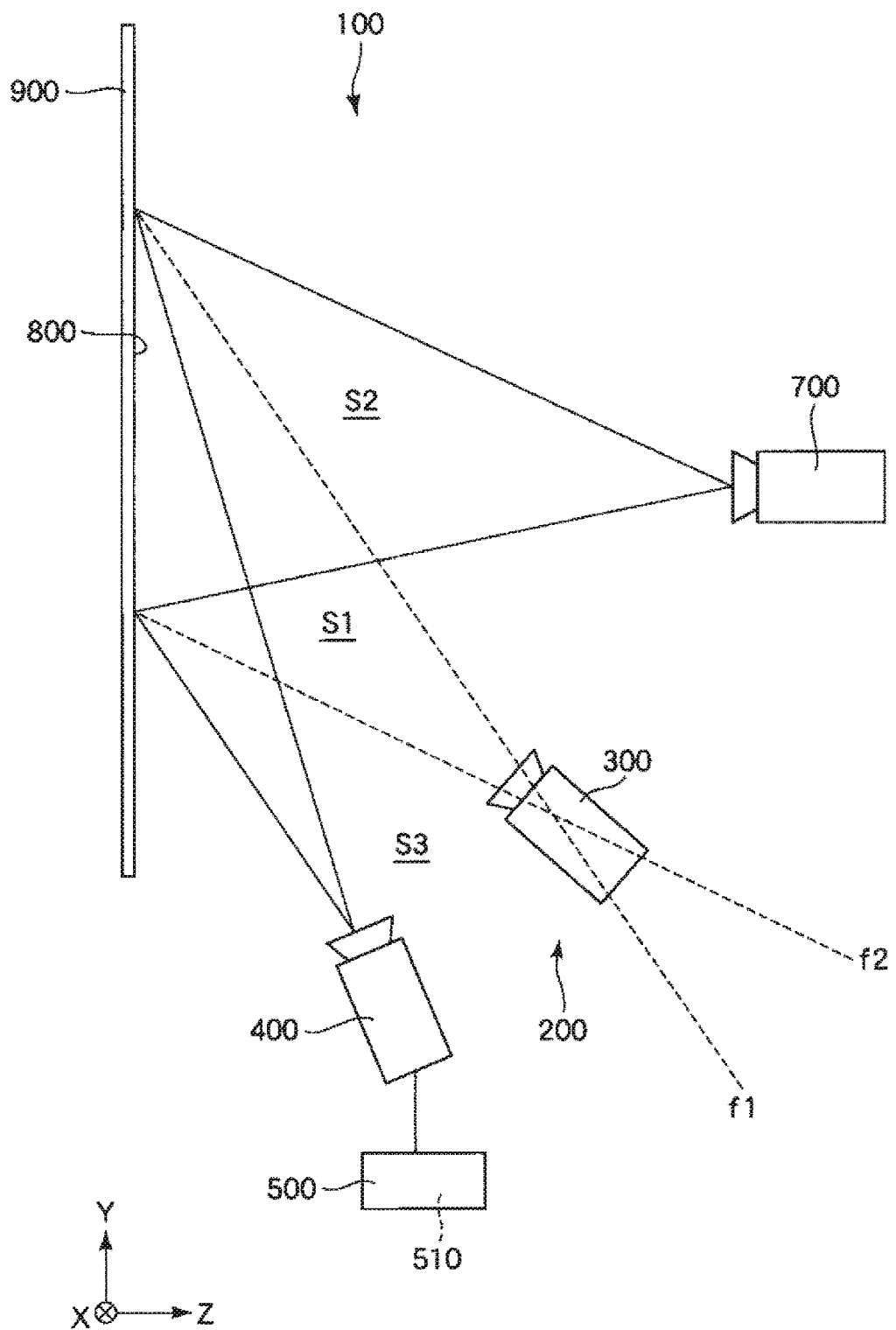
FIG. 14 is a side view showing the configuration of an image recognition unit according to a fifth embodiment of the invention.

FIG. 14 is a side view showing the configuration of the image recognition unit according to the fifth embodiment of the invention.

The image recognition unit according to the fifth embodiment of the invention is described below. Differences from the foregoing embodiments are mainly described and the description of similar matters is omitted.

The image recognition unit in the fifth embodiment is similar to the first embodiment, except in that the arrangement of the image capturing element and the detection image display device is different. Similar components as those in the foregoing embodiments are denoted by the same reference signs.

As shown in FIG. 14, in this embodiment, the camera 400 is arranged in the third orthant S3. Also, the projector 300 is installed, for example, on the floor and is arranged in such a way as to emit light obliquely upward from a relatively low position. Light having an optical axis which coincides with the normal line to the screen 900 is not emitted from the projector 300. Both the first imaginary plane f1 and the second imaginary plane f2 are tilted in such a way that the screen 900 side is situated above the projector 300 side. With the projector 300 and the camera 400 arranged in this way, the camera 400 can more securely capture an image of the missing part 890 when the finger F exists between the projector 300 and the screen 900.

In this embodiment, the configuration of the first embodiment is inverted upside down. Inverting upside down the description of the first embodiment results in the description of this embodiment. Therefore, detailed explanation of this embodiment is omitted.

The fifth embodiment as described above can achieve effects similar to those of the first embodiment.

Sixth Embodiment

Next, an image recognition unit according to a sixth embodiment of the invention will be described.

Figure 15:
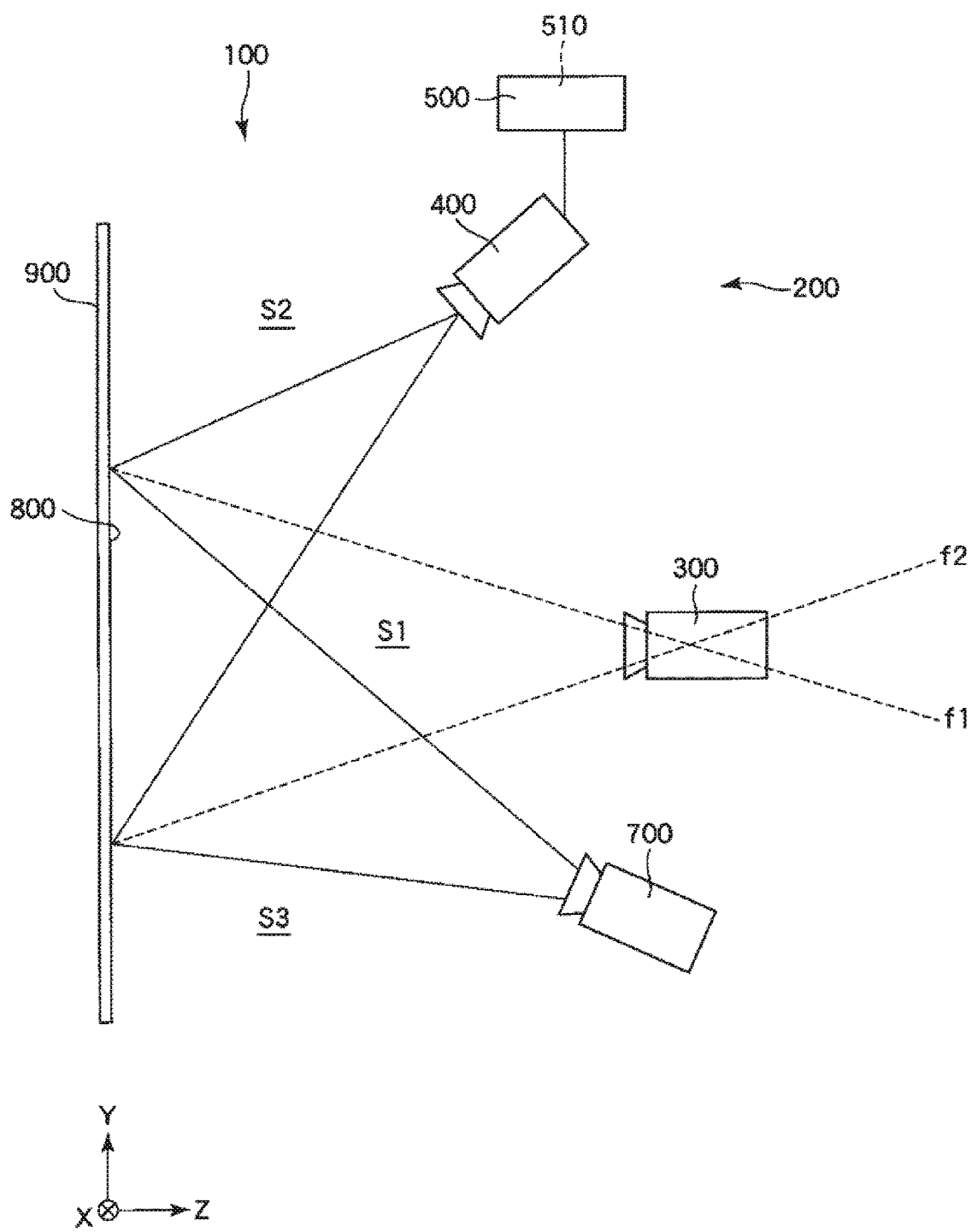
FIG. 15 is a side view showing the configuration of an image recognition unit according to a sixth embodiment of the invention.

FIG. 15 is a side view showing the configuration of the image recognition unit according to the sixth embodiment of the invention.

The image recognition unit according to the sixth embodiment of the invention is described below. Differences from the foregoing embodiments are mainly described and the description of similar matters is omitted.

The image recognition unit in the sixth embodiment is similar to the first embodiment, except in that the arrangement of the detection image display device is different. Similar components as those in the foregoing embodiments are denoted by the same reference signs.

As shown in FIG. 15, in this embodiment, light having an optical axis which coincides with the normal line to the screen 900 is emitted from the projector 300. The first imaginary plane f1 is tilted in such a way that the screen 900 side is situated above the projector 300 side. The second imaginary plane f2 is tilted in such a way that the screen 900 side is situated below the projector 300 side.

The sixth embodiment as described above can achieve effects similar to those of the first embodiment.

The image recognition device, the image recognition method, and the image recognition unit according to the invention have been described above, based on the illustrated embodiments. However, the invention is not limited to these embodiments. For example, in the image recognition device according to the invention, the configuration of each part can be replaced by an arbitrary configuration having a similar function. Also, another arbitrary configuration can be added.

Also, while the Y-axis is arranged along the vertical direction in the foregoing embodiments, the Y-axis need not be along the vertical direction. That is, the Y-axis in the embodiments may be rotated about the X-axis by a predetermined angle or rotated about the Z-axis by a predetermined angle.

REFERENCE SIGNS LIST

100 . . . image recognition unit, 200 . . . image display unit, 300 . . . projector, 400 . . . camera, 500 . . . image recognition device, 510 . . . image processing unit, 700 . . . projector, 800 . . . detection image, 800A . . . first area, 800B . . . second area, 810 . . . linear pattern, 811, 812 . . . linear pattern, 811a, 812a . . . missing portion, 820 . . . first linear pattern, 830 . . . second linear pattern, 850, 860 . . . linear pattern, 861, 862, 863 . . . linear patterns, 890 . . . missing part, 900 . . . screen, C1 . . . camera center, C2 . . . projector center, D . . . distance, EL, EL' . . . epipolar line, F . . . finger, Lf . . . line segment, 11, 12, 13 . . . straight line, M . . . marker, P1, P2 . . . position, $P_{811}$, $P_{812}$ . . . midpoint, Pe . . . epipolar point, Pm . . . vertex, S1 . . . first orthant, S2 . . . second orthant, S3 . . . third orthant, f1 . . . first imaginary plane, f2 . . . second imaginary plane, x . . . coordinate, $\Sigma$ . . . epipolar plane, $\pi 1$ . . . image plane, $\pi 2$ . . . imaginary image plane

The invention claimed is:

1. An image recognition device determining whether an object is in contact with an image display surface or not, based on an image of the image display surface, on which a detection image is displayed by a detection image display device, captured by an image capturing device, comprising an image processing unit configured to:
   detect, based on the image captured by the image capturing device, a distance, along an epipolar line, between a missing part and the detection image that is displayed on the object situated between the detection image display device and the image display surface, the missing part being generated on the image display surface due to light from the detection image display device being blocked by the object, and the epipolar line being decided based on a positional relation between the image capturing device and the detection image display device and passing through the missing part, and
   determine whether the object is in contact with the image display surface or not, based on the detected distance.

2. The image recognition device according to claim 1, wherein
   the detection image has a linear pattern intersecting the epipolar line.

3. The image recognition device according to claim 2, wherein
   a missing portion of the linear pattern due to the missing part is displayed on the object, and
   the image processing unit detects a distance along the epipolar line between a position where the missing portion is displayed when the object is absent and an actual position where the missing portion is displayed on the object.

4. The image recognition device according to claim 1, wherein the image processing unit has a position estimation unit which estimates a position of a distal end part of the object, based on a shape of the missing part.

5. The image recognition device according to claim 1, wherein
   the detection image has a first linear pattern and a second linear pattern which extend intersecting the epipolar line and which are different patterns from each other, and
   the first linear pattern and the second linear pattern are arranged alternately along a direction of extension of the epipolar line.

6. The image recognition device according to claim 1, wherein
   the detection image has a first area situated on a near side to the image capturing device and a second area situated on a farther side from the image capturing device than the first area, and
   a linear pattern extending along the epipolar line is arranged in the first area, and a linear pattern intersecting the epipolar line is arranged in the second area.

7. An image recognition unit comprising:
   the image recognition device according to claim 1;
   the detection image display device; and
   the image capturing device.

8. The image recognition unit according to claim 7, comprising
   an image display device which displays an image on the image display surface.

9. The image recognition device according to claim 1, wherein
   when a plane including a group of beams forming an upper end in a vertical direction of the detection image is defined as a first imaginary plane, a plane including a group of beams forming a lower end in the vertical direction of the detection image is defined as a second imaginary plane, an area situated between the image display surface and the detection image display device and between the first imaginary plane and the second imaginary plane is defined as a first orthant, an area situated above the first orthant in the vertical direction is defined as a second orthant, and an area situated below the first orthant in the vertical direction is defined as a third orthant, the image capturing device is arranged in the second orthant or the third orthant.

10. The image recognition device according to claim 9, wherein
    the image capturing device is arranged in the second orthant, and
    both the first imaginary plane and the second imaginary plane are tilted in such a way that the image display surface side is situated below the detection image display device side.

11. The image recognition device according to claim 9, wherein
    the image capturing device is arranged in the third orthant, and
    both the first imaginary plane and the second imaginary plane are tilted in such a way that the image display surface side is situated above the detection image display device side.

12. An image recognition method determining whether an object is in contact with an image display surface or not, based on an image of the image display surface, on which a detection image is displayed by a detection image display device, captured by an image capturing device, comprising:
    detecting, based on the image captured by the image capturing device, a distance, along an epipolar line, between a missing part and the detection image that is displayed on the object situated between the detection image display device and the image display surface, the missing part being generated on the image display surface due to light from the detection image display device being blocked by the object, and the epipolar line being decided based on a positional relation between the image capturing device and the detection image display device and passing through the missing part, and determining whether the object is in contact with the image display surface or not, based on the detected distance.

\* \* \* \* \*